(12) United States Patent
Wobbe et al.

(10) Patent No.: US 9,691,053 B1
(45) Date of Patent: Jun. 27, 2017

(54) SYSTEM AND METHOD OF MASTER DATA MANAGEMENT

(75) Inventors: Matthias Wobbe, Oftersheim (DE);
Christoph Wobbe, Schwetzingen (DE);
Uwe Kirchner, Heidelberg (DE);
Walter G. Kienle, St. Leon-Rot (DE)

(73) Assignee: SAP SE, Walldorf (DE)

( * ) Notice: Subject to any disclaimer, the term of this patent is extended or adjusted under 35 U.S.C. 154(b) by 3130 days.

(21) Appl. No.: 10/750,538

(22) Filed: Dec. 31, 2003

Related U.S. Application Data

(60) Provisional application No. 60/447,884, filed on Feb. 13, 2003.

(51) Int. Cl.
*G06Q 10/00* (2012.01)

(52) U.S. Cl.
CPC .................. *G06Q 10/20* (2013.01)

(58) Field of Classification Search
CPC ...................................................... G06Q 10/20
USPC ............ 705/1.1, 7.11, 7.12, 7.22, 7.23, 7.24,
705/7.25, 7.26, 7.27, 28, 301, 305, 308,
705/348, 500
See application file for complete search history.

(56) References Cited

U.S. PATENT DOCUMENTS

| | | |
|---|---|---|
| 4,459,663 A | 7/1984 | Dye |
| 5,099,431 A | 3/1992 | Natarajan |
| 5,182,705 A | 1/1993 | Barr et al. |
| 5,191,534 A | 3/1993 | Orr et al. |
| 5,311,424 A | 5/1994 | Mukherjee et al. |

(Continued)

FOREIGN PATENT DOCUMENTS

| | | | | |
|---|---|---|---|---|
| AU | 200072446 | * | 2/2001 | ............ G07C 11/00 |
| CA | 2391829 | | 6/2001 | |

(Continued)

OTHER PUBLICATIONS

Sheth and Larson, "Federated Database Systems for Managing Distributed, Heterogeneous, and Autonomous Databases," ACM Computing Surveys, 1990, 22(3):184-236.*

(Continued)

*Primary Examiner* — Carrie S Gilkey
(74) *Attorney, Agent, or Firm* — Schwegman Lundberg & Woessner, P.A.

(57) ABSTRACT

Methods and apparatus, including computer program products, for data management pertaining to master data management, processing, and optimization; to maintenance management; and to asset management. A master data management system may include a dynamic object identification system. The dynamic object identification system may identify objects using a segmented and coded globally unique identifier. The globally unique identifier may be updated while the objects are within the system. The globally unique identifier may comprise coded segments including a personal identification number, an external key, technical data, and administration data. The technical and administration data may be more or less detailed, depending on, among others, the object, its history of use, and its present circumstances. Implementation of the asset management system may include the use of radio-frequency identification (RFID) tags. The RFID tags may store detailed object information, including critical object information and a globally unique identifier.

73 Claims, 9 Drawing Sheets

(56) References Cited

U.S. PATENT DOCUMENTS

| | | |
|---|---|---|
| 5,335,346 A | 8/1994 | Fabbio |
| 5,418,945 A | 5/1995 | Carter et al. |
| 5,442,782 A | 8/1995 | Malatesta et al. |
| 5,655,085 A | 8/1997 | Ryan et al. |
| 5,694,598 A | 12/1997 | Durand et al. |
| 5,703,938 A | 12/1997 | Lucas et al. |
| 5,710,884 A | 1/1998 | Dedrick |
| 5,737,227 A * | 4/1998 | Greenfield et al. ........... 705/400 |
| 5,758,031 A | 5/1998 | De Silva |
| 5,859,972 A | 1/1999 | Subramaniam et al. |
| 5,911,139 A | 6/1999 | Jain et al. |
| 5,966,715 A | 10/1999 | Sweeney et al. |
| 6,006,334 A | 12/1999 | Nguyen et al. |
| 6,018,742 A | 1/2000 | Herbert, III |
| 6,029,195 A | 2/2000 | Herz |
| 6,032,147 A | 2/2000 | Williams et al. |
| 6,055,506 A * | 4/2000 | Frasca, Jr. ........................ 705/3 |
| 6,067,525 A | 5/2000 | Johnson et al. |
| 6,172,596 B1 | 1/2001 | Cesar et al. |
| 6,226,650 B1 | 5/2001 | Mahajan et al. |
| 6,236,997 B1 | 5/2001 | Bodamer et al. |
| 6,324,647 B1 | 11/2001 | Bowman-Amuah |
| 6,330,598 B1 | 12/2001 | Beckwith et al. |
| 6,405,132 B1 | 6/2002 | Breed et al. |
| 6,480,755 B1 | 11/2002 | Ootani et al. |
| 6,487,594 B1 | 11/2002 | Bahlmann |
| 6,529,948 B1 | 3/2003 | Bowman-Amuah |
| 6,567,818 B1 | 5/2003 | Frey et al. |
| 6,711,456 B2 | 3/2004 | Yokomori et al. |
| 6,718,361 B1 | 4/2004 | Basani et al. |
| 6,738,682 B1 | 5/2004 | Pasadyn |
| 6,754,666 B1 | 6/2004 | Brookler et al. |
| 6,768,944 B2 | 7/2004 | Breed et al. |
| 6,842,881 B2 | 1/2005 | Croke et al. |
| 6,857,123 B1 | 2/2005 | Nuxoll et al. |
| 6,895,408 B1 | 5/2005 | Kavantzas |
| 6,915,287 B1 | 7/2005 | Felsted et al. |
| 7,103,605 B1 | 9/2006 | Hazi et al. |
| 7,240,296 B1 * | 7/2007 | Matthews et al. ............ 715/840 |
| 7,484,008 B1 * | 1/2009 | Gelvin et al. ................. 709/249 |
| 8,061,604 B1 | 11/2011 | Wobbe et al. |
| 2002/0002520 A1 * | 1/2002 | Gatto ............................ 705/36 |
| 2002/0035495 A1 * | 3/2002 | Spira et al. ........................ 705/7 |
| 2002/0038267 A1 | 3/2002 | Can et al. |
| 2002/0065892 A1 | 5/2002 | Malik |
| 2002/0073114 A1 | 6/2002 | Nicastro et al. |
| 2002/0087510 A1 * | 7/2002 | Weinberg et al. ................. 707/1 |
| 2002/0087554 A1 | 7/2002 | Seelinger |
| 2002/0095454 A1 | 7/2002 | Reed et al. |
| 2002/0116417 A1 | 8/2002 | Weinberg et al. |
| 2002/0124005 A1 | 9/2002 | Matson et al. |
| 2002/0128904 A1 | 9/2002 | Carruthers et al. |
| 2002/0156688 A1 | 10/2002 | Horn et al. |
| 2002/0161778 A1 | 10/2002 | Linstedt |
| 2002/0184308 A1 | 12/2002 | Levy et al. |
| 2002/0194196 A1 | 12/2002 | Weinberg et al. |
| 2003/0018878 A1 | 1/2003 | Dorward et al. |
| 2003/0028519 A1 | 2/2003 | Burgess |
| 2003/0083964 A1 | 5/2003 | Horwitz et al. |
| 2003/0135495 A1 | 7/2003 | Vagnozzi |
| 2003/0161778 A1 | 8/2003 | De Waal |
| 2003/0191832 A1 | 10/2003 | Satyavolu et al. |
| 2003/0216969 A1 * | 11/2003 | Bauer et al. .................... 705/22 |
| 2003/0233347 A1 | 12/2003 | Weinberg et al. |
| 2004/0015408 A1 | 1/2004 | Rauen, IV et al. |
| 2004/0073475 A1 * | 4/2004 | Tupper ............................ 705/10 |
| 2005/0038551 A1 | 2/2005 | Mazumder et al. |
| 2006/0064456 A1 | 3/2006 | Kalthoff et al. |

FOREIGN PATENT DOCUMENTS

| | | |
|---|---|---|
| DE | 10049940 A1 | 4/2002 |
| WO | WO 01/37097 | 5/2001 |
| WO | WO-0137097 A1 | 5/2001 |
| WO | WO 02/25471 | 3/2002 |
| WO | WO 02/25500 | 3/2002 |
| WO | WO-0225471 A2 | 3/2002 |
| WO | WO-0225500 A2 | 3/2002 |
| WO | WO 02/47463 | 6/2002 |
| WO | WO-0247463 A2 | 6/2002 |
| WO | 03/093998 | 11/2003 |

OTHER PUBLICATIONS

Haerder T. et al., "Integritaetskontrolle," Datenbanken Konzepte und Techniken Der Implementierung, 1999, pp. 397-405, XP002294581 [translation provided].

U.S. Appl. No. 09/577,268, filed May 2000, Hazi et al.

U.S. Appl. No. 09/643,207, filed Aug. 2000, Brookler et al.

U.S. Appl. No. 09/643,316, filed Aug. 2000, Brookler et al.

Haerder T. et al., "RX-Sperrverfahren," Datenbanken Konzepte und Techniken Der Implementierung, 1999, pp. 419-420, XP002294552 [translation provided].

Berndtsson et al., Task Sharing Among Agents Using Reactive Rules, Cooperative Operation Systems, 1997. COOPIS '97., Proceedings of the Second IFCIS International, Jun. 24-27, 1997, pp. 56-65.

Hill et al., "Data Transformation: Key to Information Sharing" Gartner Group Strategic Analysis Report, Sep. 29, 1998 (Sep. 29, 1998), pp. 1-60.

Bertino, Elisa, et al., "Data Security," Proceedings of the Twenty-Second Annual International Computer Software and Applications Conference, Vienna, Austria, Aug. 19-21, 1998, Los Alamitos, CA, USA, Aug. 19, 1998, (CompSAC '98), XP010305455, pp. 228-237.

Bon, M., et al., "Sharing Product Data Among Heterogeneous Workflow Environments," CAD 2002: Corporate Engineering Research, Geman Informatics Society, Mar. 4-5, 2002, Dresden, Germany, XP002268575, pp. 1-10.

Chandramouli, Ramaswamy, "Application of XML Tools for Enterprise-Wide RBAC Implementation Tasks," Proceedings of the 5$^{th}$ ACM Workshop on Role-Based Access Control, Berlin, Germany, Jul. 26-27, 2000, XP000958089, pp. 11-18.

Choi, Jin Oh, et al., "Update Propagation of Replicated Data in Distributed Spatial Databases," Proceedings of Database and Expert Systems Applications: Tenth International Conference, Florence, Italy, Aug. 30, 1999-Sep. 2, 1999, DEXA '99 (Lecture Notes in Computer Science vol. 1677), Berlin, Germany, Springer-Verlag, Germany, XP009022583, pp. 952-963.

Chou, H-T. et al., "Versions and Change Notification in an Object-Oriented Database System", Proceedings of the Design Automation Conference, Anaheim, Jun. 12-15, 1988, Proceedings of the Design Automation Conference (DAC), New York, IEEE, US, vol. CONF. 25, Jun. 12, 1988, pp. 275-281, XP010013006, ISBN: 0/8186-0864-1.

Ferreira Rezende, Fernando de, et al., "A Lock Method for KBMSs Using Abstraction Relationships' Semantics," Proceedings of the International Conference on Information and Knowledge Management, CIKM, ACM, New York, NY, USA, 1994, XP002943684, pp. 112-121.

Hong, B. et al., "Modeling of Version Relationships for CAD Databases", Computers and Communications Technology Toward 2000, Seoul, Aug. 25-28, 1987, Proceedings of the Region 10 Conference, (TENCON), New York, IEEE, US, vol. 1, Conf. 3, Aug. 25, 1987, pp. 142-146, XP000011783.

Kamita, T. et al., "A Database Architecture and Version Control for Group Work", System Sciences, 1994, vol. III: Information Systems: Decision Support and Knowledge-Based Systems, Proceedings of the Twenty-Seventh Hawaii International Conference on Wailea, HI, US, Jan. 4-7, 1994, Los Alamitos, CA, US, IEEE Comput. Soc., Jan. 4, 1994, pp. 438-447, XP010097053, ISBN: 0-8186-5070-2.

Rana, S.P. et al., "Version Support for Manufacturing Database Systems", International Conference on Industrial & Engineering Applications of Artificial Intelligence & Expert Systems, Tullahoma, IN, US, New York, NY, US, vol. 2, Jun. 6, 1989, pp. 779-784, XP000605772.

(56) References Cited

OTHER PUBLICATIONS

Anonymous "Data Profiling the Foundation for Data Management" *DataFlux Corporation*, Jul. 1, 2004, pp. 1-17.
Garcia et al. "Immunization Registries DeDuplication and Record Matching," *White Paper*, 1999, pp. 1-11.
Georgakopoulos et al. "An Overview of Workflow Management: From Process Modeling to Workflow Automation Infrastructure," *Distributed and Parallel Databases*, 1995, vol. 3, No. 2, pp 119-153.
Rahm et al. "Data Cleaning: Problems and Current Approaches," *Quarterly Bulletin of the Computer Society of the IEEE Technical Committee on Data Engineering*, Dec. 2000, pp. 1-11.
Chan and Suwanda, "Designing Multinational Online Stores: Challenges, Implementation Techniques and Experience", *IBM Centre for Advanced Studies Conference: Proceedings of the Centre for Advanced Studies on Collaborative research*, Mississauga, Ontario, Canada, 2000, pp. 1-14.
Sheth and Larson, "Federated Database Systems for Managing Distributed, Heterogeneous, and Antonomous Databases", *ACM Computing Surveys*, 1990, 22(3): 184-236.
"U.S. Appl. No. 10/749,808, Advisory Action mailed Sep. 2, 2008", 3 pgs.
"U.S. Appl. No. 10/749,808, Final Office Action mailed Apr. 30, 2008", 15 pgs.
"U.S. Appl. No. 10/749,808, Final Office Action mailed May 29, 2009", 16 pgs.
"U.S. Appl. No. 10/749,808, Non Final Office Action mailed Nov. 21, 2008", 15 pgs.
"U.S. Appl. No. 10/749,808, Non Final Office Action mailed Sep. 20, 2007", 14 pgs.
"U.S. Appl. No. 10/749,808, Response filed Jan. 22, 2008 to Non-Final Office Action mailed Sep. 20, 2007", 12 pgs.
"U.S. Appl. No. 10/749,808, Response filed Feb. 17, 2009 to Non-Final Office Action mailed Nov. 21, 2008", 11 pgs.
"U.S. Appl. No. 10/749,808, Response filed Aug. 13, 2008 to Final Office Action mailed Apr. 30, 2008", 9 pgs.
"U.S. Appl. No. 10/749,808, Response filed Sep. 30, 2008 to Final Office Action mailed Apr. 30, 2008", 9 pgs.
Chaudhuri, Surajit, et al., "An Overview of Data Warehousing and OLAP Technology," SIGMOD Record, New York, NY, USA, vol. 26, No. 1, Mar. 1997, pp. 65-74, XP002193792, ISSN: 0163-5808.
Rahm, Erhard, et al., "Data Cleaning: Problems and Current Approaches," IEEE Bulletin of the Technical Committee on Data Engineering, vol. 23, No. 4, retrieved from the Internet Dec. 2000 at http://lips.informatik.uni-leipzig.de:80/pub/2000-45, XP002284896, 11 pgs.
"SyncML Protocol, version 1.0," Internet Citation, Dec. 7, 2000, XP002217356, 60 pgs.
"U.S. Appl. No. 10/749,808, Non-Final Office Action mailed Dec. 30, 2009", 4 pgs.
"U.S. Appl. No. 10/749,808, Response filed Sep. 29, 2009 to Advisory Action mailed Sep. 3, 2009", 11 pgs.
"U.S. Appl. No. 10/749,808, Examiner Interview Summary mailed Nov. 19, 2010", 1 pg.
"U.S. Appl. No. 10/749,808, Comments on Statement of Reasons for Allowance filed Sep. 23, 2011", 1 pg.
"U.S. Appl. No. 10/749,808, Response filed Jul. 28, 2009 to Final Office Action mailed May 29, 2009", 11 pgs.
"U.S. Appl. No. 10/749,808, Advisory Action mailed Sep. 3, 2009", 3 pgs.
"U.S. Appl. No. 10/749,808, Final Office Action mailed Jun. 18, 2010", 18 Pgs.
"U.S. Appl. No. 10/749,808, Non Final Office Action mailed Nov. 26, 2010", 6 pgs.
"U.S. Appl. No. 10/749,808, Response filed Mar. 29, 2010 to Non Final Office Action mailed Dec. 30, 2009", 12 pgs.
"U.S. Appl. No. 10/749,808, Response filed Sep. 20, 2010 to Final Office Action mailed Jun. 18, 2010", 13 pgs.
"U.S. Appl. No. 10/749,808, Notice of Allowance mailed Jun. 30, 2011", 10 pgs.
"U.S. Appl. No. 10/749,808, Response filed Mar. 10, 2011 to Non Final Office Action mailed Nov. 26, 2010", 12 pgs.

\* cited by examiner

SYSTEM AND METHOD OF MASTER DATA MANAGEMENT

This application claims the benefit of U.S. Provisional Application No. 60/447,884, filed on Feb. 13, 2003, which is incorporated by reference herein.

BACKGROUND

The present invention relates to data management systems.

Since the launch of Reliability Centered Maintenance (RCM) in the early 1960s for the commercial airline industry, engineering techniques have been used to identify critical equipment and to develop optimized maintenance programs for complex asset structures, such as those first applied to the maintenance program of the Boeing 747. RCM is now used in all major industries and is suitable where equipment failure poses high safety, economic and environmental risks. Fundamental aspects of maintenance optimization include the determinations of which equipment is critical, how the asset structure is constructed, which objects have to be tracked, and which objects pose the greatest safety, economic and environmental risks.

In regulated industries (Aerospace, Chemical, etc.), companies often are required to track critical equipment. For most of the equipment, the decision whether to track a piece of equipment in a maintenance system is within the discretion and responsibility of the engineers and maintenance managers. A challenge for a company that starts a project to implement a maintenance management solution simply may be deciding upon the scope of the project, which depends in part on which pieces of equipment the company decides are critical and could be relevant for maintenance improvements. Even before the time at which an asset is installed, one may need to inquire: Should the asset be tracked individually as unique equipment, or not? If yes, is it necessary to track parts of the asset individually as sub-equipment? Due to the rapid changes in technology and the shortened life-cycle for high-tech equipment, the potential number of pieces to be tracked individually is growing very quickly.

SUMMARY OF THE INVENTION

The present invention provides methods and apparatuses, including computer program products, for data management pertaining to master data management and processing; to maintenance management, including optimization of master data management; and to asset management, including maintenance management. A user may select master data from object data that may be available or generated about a given object. A master data management system (MDMS) may include a dynamic object identification system. The dynamic object identification system may identify objects using a segmented and coded globally unique identifier. The globally unique identifier (GUID) may be updated while the objects are within the system. The globally unique identifier may comprise coded segments including a personal identification number, an external key, technical data, and administration data. The technical and administration data may be more or less detailed, i.e., of variable detail, depending on, among others, the object, its history of use, and its present circumstances.

A maintenance management system may include a master data management system and a master data processing system that processes the master data generated and managed by the master data management system. The master data processing system may provide the maintenance management system with object-related knowledge based on the master data managed by the master data management system. The maintenance management system may then, for example, forecast, requisition, schedule, track, and evaluate maintenance as it occurs (or does not occur, as the case may be) based on data input by a user, the master data management system, or some other data input source.

An asset management system may include a maintenance management system, a master data management system, and a master data processing system.

In general, in one aspect, the invention features a dynamic object identification system. The invention can be implemented to include one or more of the following advantageous features. One or more fade out indicators may be associated with the master data to remove data that are not accessed or modified by a fade out date, within a fade out period or after a fade out level of use, which may be rule-based (e.g., the fade out indicator may be triggered when an actual or projected fade out level of use is reached). As the conditions or circumstances of an object change and a history develops, such as when the object is used, repaired, or relocated, the data associated with the object may be updated, and the fade out indicators may be updated for the updated data. Updating a fade out indicator may include, for example, choosing a new date, resetting a use-counter, and/or restarting a timer.

In managing the objects, their master data and their maintenance, the user may configure object criteria for importance, risk, wear, etc., separately for each object, possibly in conjunction with relative fade out indicators. The object criteria likewise may be updated, therefore, as necessary, to reflect, for example, any changes in the conditions or requirements of an object. For instance, the administration data for winter tires may have fade out indicators relative to the beginning and/or end of the winter season, when presumably the administration data of the winter tires would require evaluation, whereas the technical data for the winter tires may have fade out indicators relative to the average life-span of the winter tires, measured in kilometers driven, at which point the continued use of the winter tires may be questionable.

The fade out indicators also may be considered by the master data processing system to generate further object-related knowledge, such as determining the level of detail of the master data displayed within the maintenance management system, resulting in a dynamic display of asset data. For example, a user may choose to display less data about objects with which the user has frequent contact and therefore is very familiar. The dynamic object identification system may be implemented using, for example, bar coding in conjunction with infra-red scanning technology, or programmable radio-frequency identification tagging in conjunction with radio-frequency transceiver technology.

The invention can be implemented to realize one or more of the following advantages. Within a maintenance management solution, the master data management system may be self-optimizing wherein the system can automatically propose over the lifetime of the equipment which objects should be tracked individually; which objects might be removed, tracked as spares or deleted; and which locations or asset structures are critical and should be tracked more intensively. Use of programmable radio-frequency identification (RFID) tagging may permit on-site updating of globally unique identifier information, such as pertains to updating of expiration data based on the fade out indicators. Tracking maintenance actions directly on an RFID tag may permit a user immediate on-site maintenance information without accessing the master data management system. Storage of detailed object information directly on the RFID tag, with only minimal object information stored in the master data management system, may distribute data storage, minimize the volume of master data to be managed, reduce the central storage of excessive data, and reduce data management and storage costs. Storing critical object information in the GUID and detailed object information primarily on only the RFID tag may more evenly distribute the data storage of object information, optimize the use of the data storage capacity on the RFID tags, and reduce the overall data storage capacity requirements on the MDMS.

Using these identification means, the maintenance of objects may be tracked and studied. Such a maintenance management system may provide a wealth of technical and financial information, with which the maintenance management system in turn may help to optimize maintenance and to develop maintenance programs that reduce maintenance costs, improve availability and improve reliability.

The details of one or more implementations of the invention are set forth in the accompanying drawings and the description below. Other features and advantages of the invention will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
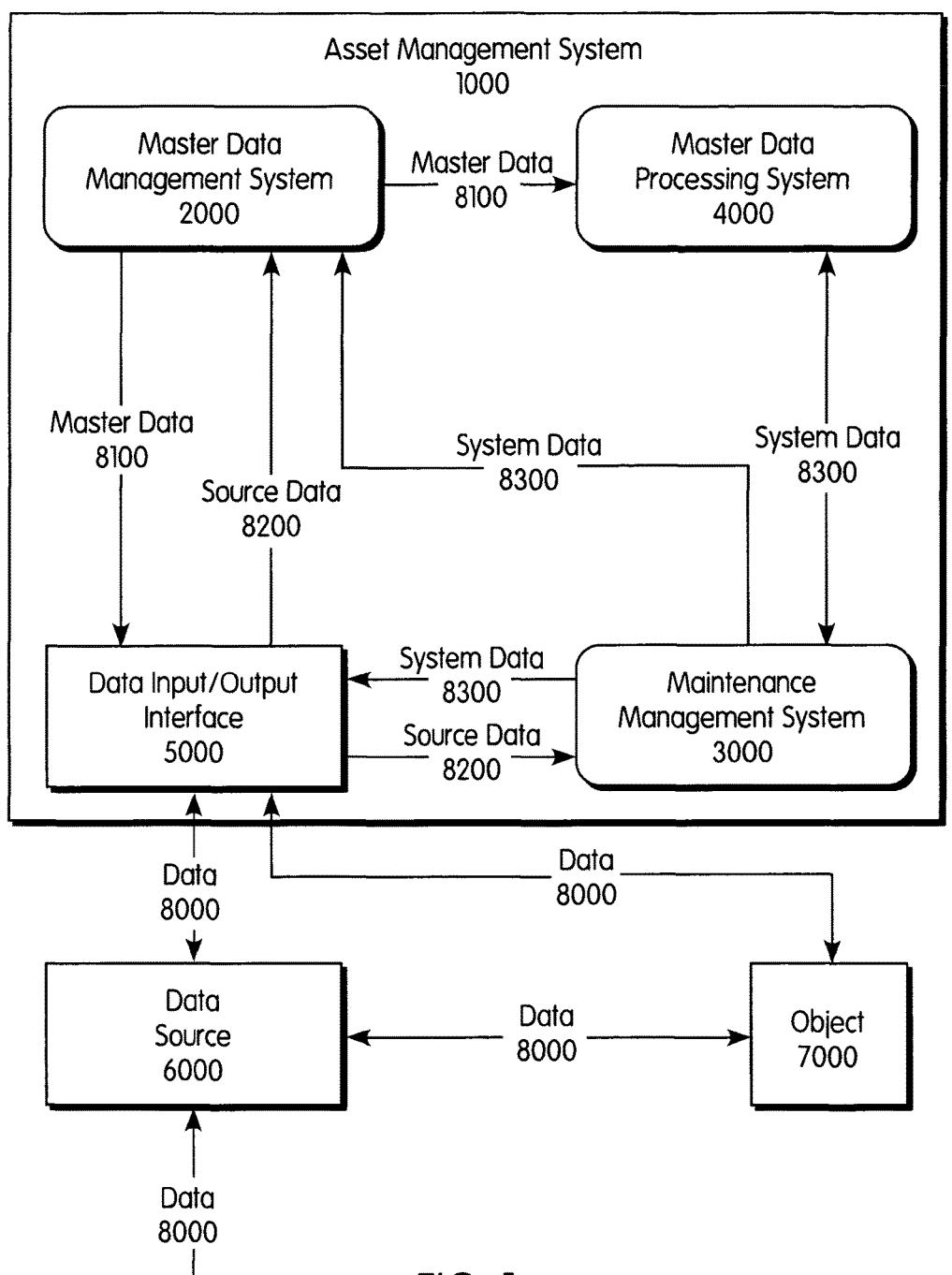
FIG. 1 is a schematic of an asset management system including a master data management system, a maintenance management system, and a master data processing system.

As shown in FIG. 1, an asset management system 1000 may include a master data management system 2000, a maintenance management system 3000, and a master data processing system 4000. The asset management system 1000 also may include a data input/output interface 5000 that is in communication with a data source 6000. The data input/output interface 5000 and data source 6000 may be specific to the asset management system 1000, or they may be shared with other systems within a computer system. For example, the data input/output interface 5000 may be hardware, such as a wireless handheld scanner with display, and the data source 6000 may be an operator of the handheld scanner. Alternatively, the data input/output interface 5000 may be software such as a graphical user interface. Associated with objects 7000 relevant to the user's business are data 8000 exchanged with and maintained within the asset management system 1000. Included among the data 8000 may be master data 8100, source data 8200 and system data 8300. The master data management system 2000 manages the master data 8100 pertaining to objects 7000 based in part on the source data 8200 and the system data 8300.

Figure 2:
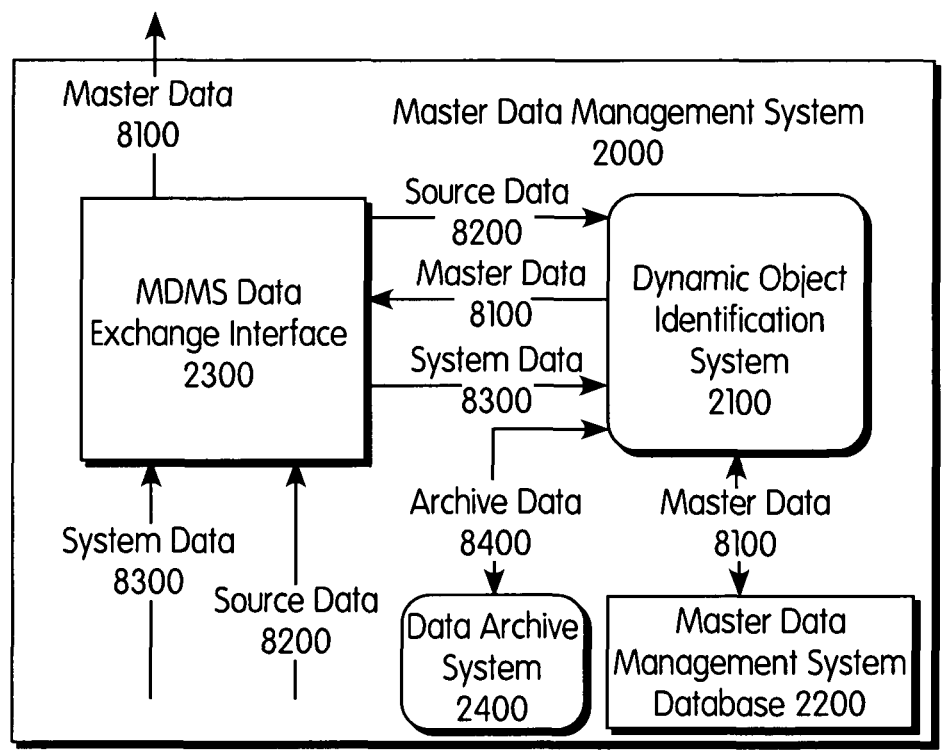
FIG. 2 is a schematic of a master data management system.

As shown in FIG. 2, the master data management system (MDMS) 2000 may include a dynamic object identification system 2100, a MDMS database 2200, and a MDMS data exchange interface 2300. The dynamic object identification system 2000 preferably does not differentiate between material, spares, and equipment from a database or table point of view. As a result, for example, a spare part may become an individually tracked piece of equipment and an individually tracked piece of equipment may become a spare part, dependent on the object's usage, importance, and relevance for maintenance, location of installation, financial value and other criteria. To accomplish this dynamic nature, the MDMS 2000 uses a new model of object identification within the MDMS database 2200 that stores the master data 8100.

The MDMS data exchange interface 2300 may receive and transfer the source data 8200 and the system data 8300, from which master data 8100 may be derived or with which master data 8100 may be updated. Generally speaking, source data 8200 include data 8000 coming from outside the asset management system 1000, whereas system data 8300 include data 8000 arising within the asset management system 1000. The master data 8100 include the data 8000 that are selected according to user configurations to capture the information about an object 7000 that the user deems important.

Figure 3:
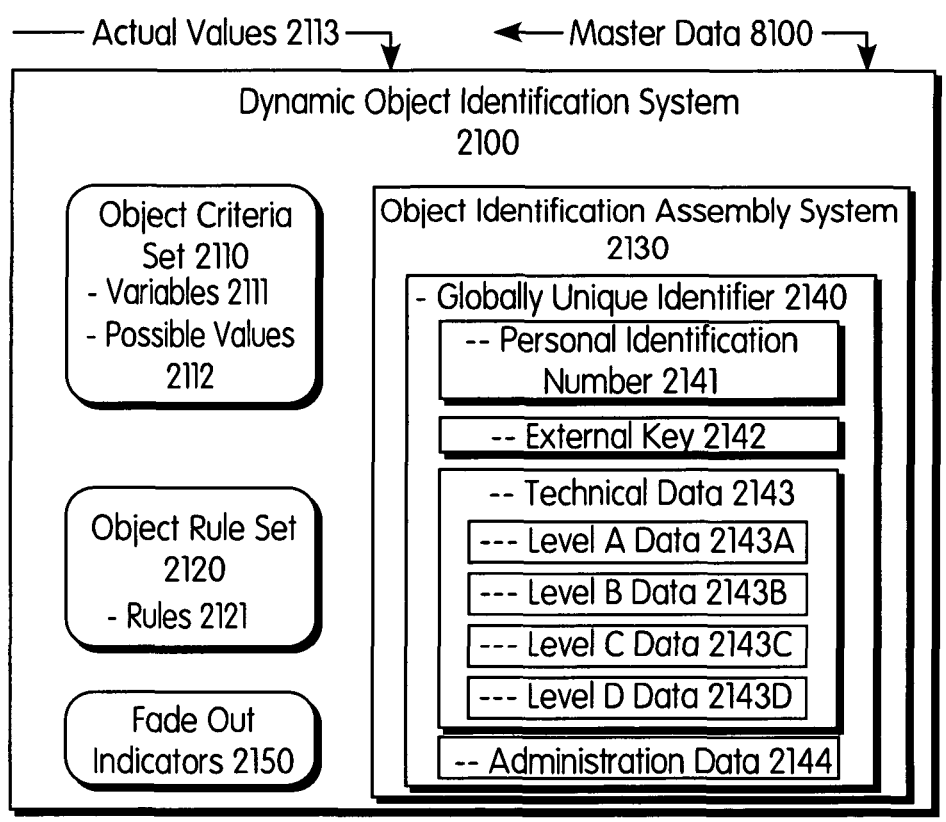
FIG. 3 is a schematic of a dynamic object identification system.

As shown in FIG. 3, a dynamic object identification system (DOIS) 2100 may include an object criteria set 2110, an object rule set 2120, and an object identification assembly system 2130. The object criteria set 2110 may include variables 2111 that may be customized according to what aspects of the objects 7000 the user considers important, relevant or both for given objects 7000. Possible values 2112 may be associated with the variables 2111 for the objects 7000, and the possible values 2112 may be expressed numerically, for example. The object rule set 2120 may include rules 2121 that may be customized by the user, based on variables 2111, to determine how data 8000 for the objects 7000 will be handled. The object identification assembly system 2130 may manage a globally unique identifier (GUID) 2140 by which each object 7000 may be identified.

Insofar as the user may configure and customize the object criteria set 2110, the object rule set 2120 and the object identification assembly system 2130, conceptual boundaries of each 2110, 2120, and 2130 may be flexible. Nonetheless, within the subjective perspective of the user, the object criteria set 2110 and the object rule set 2120 each may pertain generally to both conditions of objects 7000 and circumstances in which objects 7000 exist, whereas the object identification assembly system 2130 may pertain primarily to characteristics of specific objects 7000. As shown in FIGS. 1 and 2, the source data 8200 and the system data 8300 received by the MDMS 2000 may correspond to actual values 2113, and the GUID 2140 corresponding to a given object 7000 may include the actual values 2113 of the given object 7000.

For example, assume that an object 7000 is an illuminated "Exit" sign. The user may decide to create the following variables 2111 (represented in brackets) and possible values 2112: [bulb]: there & bright=2, there & dim=1, not there or not working=0; [status]: visible=2, partly visible=1, not visible=0; and [risk]: very high=0, high=1, medium=2, low=3, and very low=4. The user then may decide to create the following rule 2121: [risk]=[bulb]+[status]. Assuming that the user inputs source data 8200 indicating that [bulb]=1 and [status]=1, then the rule 2121 will calculate that [risk] =2, indicating that the condition of the Exit sign corresponds to a medium risk.

Moreover, the user may specify further variables 2111 and possible values 2112, for example, corresponding to the Exit sign's location, the importance of that location overall, and the importance of that location with respect to the use of the Exit sign. These variables 2111 then also may be factored, using for example another rule 2121, into a variable 2111 relating to the criticality of the specific Exit sign in question, as opposed to Exit signs in general. The criticality of the specific Exit sign likewise may be factored into a rule 2121 relating to the risk posed by the specific Exit sign. Furthermore, information such as an object's 7000 criticality and risk may be processed by the master data processing system 4000 (see FIG. 1) to generate object-related knowledge for use in the maintenance management system 3000 (see FIG. 1).

Generally speaking, knowledge may be considered information viewed in context, so object-related knowledge is object-related information viewed in the context in which the object 7000 exists. Examples of object-related knowledge of an object 7000 may include object-related information such as relative priority of maintenance to the object 7000, relative importance of the object 7000, relative criticality of the object 7000, relative risk posed by the object 7000, relative familiarity of a user with the object 7000, projected time of anticipated required maintenance to the object 7000, and projected time of failure of the object 7000.

The maintenance management system may consider the object-related knowledge of an object 7000 in performing, for example, a maintenance management technique such as prioritizing maintenance; scheduling maintenance; ordering maintenance materials (e.g., replacement parts, maintenance tools, and replenishment materials, such as lubricants); arranging maintenance services (in view, inter alia, of cost, timing, quality, availability, and experience, such as who serviced the object in the past); notifying a user of the object-related knowledge (such as risks posed and expected delays); categorizing the object 7000; displaying master data 8100 of the object 7000 (by, for example, importance); and prompting the master data management system 2000 to perform an update of master data of the object 7000.

As an illustration, an Exit sign located in a rarely used warehouse may be much less critical than an Exit sign located in a frequently used, dimly lit underground passageway. As such, the master data processing system (MDPS) 4000 may assign a higher priority to the repair of a dim bulb in the passageway Exit sign than to the repair of a broken bulb in the warehouse Exit sign. The maintenance management system 3000 then may schedule the repair of the passageway Exit sign ahead of the repair of the warehouse Exit sign.

The master data processing system 4000 may serve as a middle layer of variable 2111 and rule 2121 based processing between the master data management system 2000 and the maintenance management system 3000 in providing the maintenance management system 300 with object-related knowledge. Generating the object-related knowledge on a need-to-use basis may further help to reduce the overall data storage burden of a master data management system 2000 by storing less data in the master data 8100, reduce the computational burden by limiting data analysis to events as events arise, and provide added flexibility in data management.

Referring back to the Exit sign example, another example of object-related knowledge may include a projected bulb-burnout date. Assuming that the master data 8100 includes an installation date and bulb type of the Exit sign, the master data processing system 4000 may store information relating to the average lifespan of the bulb type. By viewing this information in context, the master data processing system 4000 may calculate a projected bulb-burnout date and provide the projected bulb-burnout date to maintenance management system 3000, which then may schedule a bulb replacement.

Figure 4:
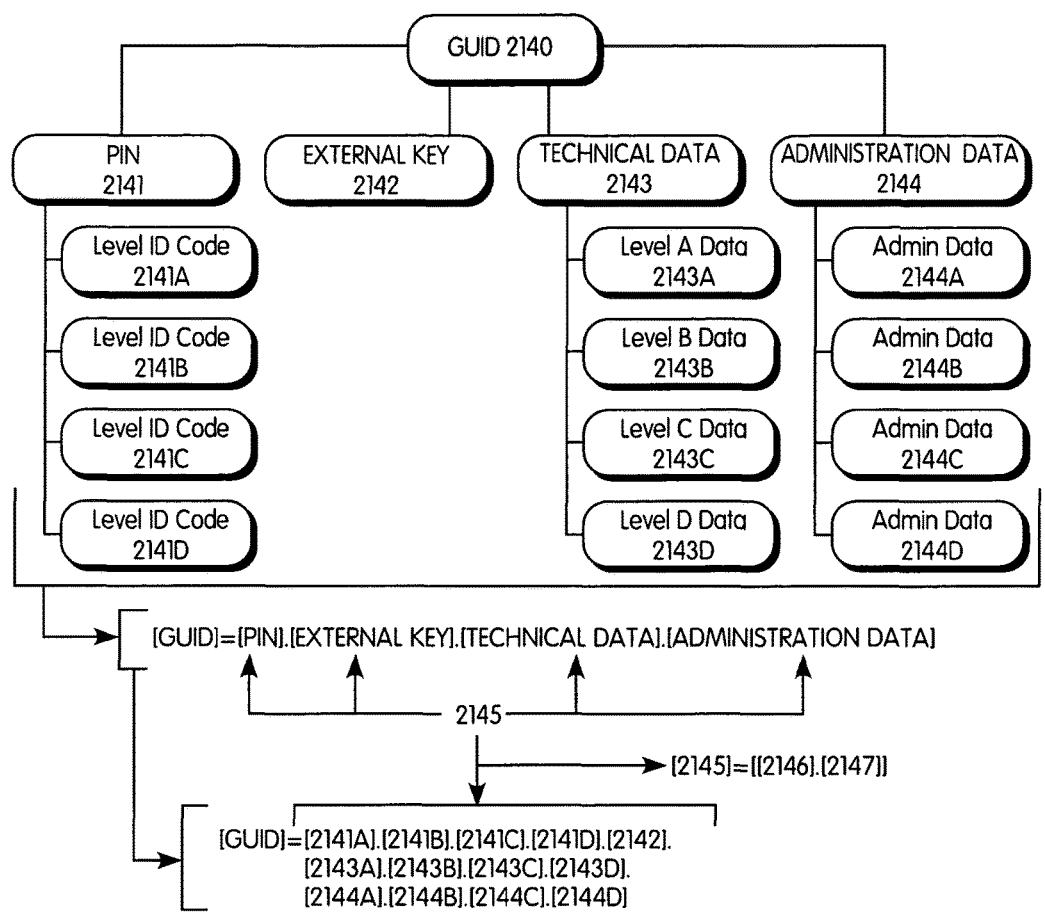
FIG. 4 is a schematic of a globally unique identifier.

As shown in FIGS. 3 and 4, each object 7000 may be identified individually by its globally unique identifier 2140. This GUID 2140 may contain coded segments including a personal identification number (PIN) 2141, an external key 2142, technical data 2143, and administration data 2144. According to a structure of the GUID 2140 chosen by the user, aspects of the PIN 2141, the external key 2142, the technical data 2143 and the administration data 2144 may overlap or be subsumed within each other. The user may construct the structure of the GUID 2140 in whole or in part from variables 2111 defined by the user.

To the extent that other systems access the GUID 2140 simply by using a variable 2111 such as [GUID], the user may reconfigure easily the GUID 2140 on an enterprise-wide level by altering a rule 2121 corresponding to the GUID 2140 at the level of the dynamic object identification system 2100. Each GUID 2140 directly may include "raw," i.e., unindexed, master data 8100 corresponding to a specific object 7000, or the GUID 2140 may include indexed master data 8100. Inasmuch as any two GUIDs 2140 have master data 8100 in common, though, it may be more efficient to index the actual values 2113 of the master data 8100 in common within the list of possible values 2112 for a given variable 2111 corresponding to the master data 8100 in common. As an illustration, a GUID 2140 is shown in FIG. 4 as a string of indexed master data 8100, composed of multiple index coded segments 2145 corresponding to variables 2111 and the actual values 2113. For example, each index coded segment 2145 may include a designation of a referenced variable 2146 and an actual reference value 2147 for the referenced variable 2146.

The external key 2142 may be a name, number, or both by which the user readily identifies an object 7000. In the case of inventory having bar coded labels, for example, the external key 2142 assigned to a new object 7000 may be a next unused number in the internal inventory. In the case of a fleet of vehicles, an exemplary external key 2142 may be the make and license of the vehicle, or the vehicle registration number.

The external key 2142 may not necessarily be unique, in which case other information may be requested when retrieving a GUID 2140. As an illustration, assume that factory X and factory Y initially tracked their equipment separately, and therefore they both used an external key 2142 comprised of the digits "98765" to identify different objects 7000. Thereafter, factory X bought factory Y and consolidated the asset management. Instead of re-labeling all the objects 7000 within one or both of the factories, the asset management system 1000 may request further information from the user to identify a given object 7000, such as its location and function, until the given object 7000 is identified uniquely and the GUID 2140 may be retrieved.

Technical data 2143 for objects may be stored in a multi-level model, and a four-level model may be sufficient for most technical objects. A four-level model may include levels A, B, C, and D data, i.e., 2143A, 2143B, 2143C, and 2143D, for example. As an illustration, level "A" data 2143A may contain the "material"-like or "parts"-like data; level "B" data 2143B may contain "assembly"-like data or "spare parts"-like; level "C" data 2143D may contain serialized data; and level "D" data 2143D may contain individual technical data. Depending on various factors, such as the usage, importance, location, criticality, financial value of an object 7000, level A, B, C, and D data, 2143A-D, may be stored. In one embodiment, all levels may be linked and hierarchical. The external key 2142 possibly may coincide with or comprise the level A data 2143A, the level D data 2143D, or both, depending on the user's preferences. The external key 2142, however, need not overlap at all with levels A and D data 2143A, D.

Returning to the example of an Exit sign, level A data 2143A may indicate that the object 7000 is an illuminated Exit sign. Level B data 2143B may indicate assembly information, such as how to install the sign, what type of light bulb is used in the sign, and how to replace the bulb. Level C data 2143C may be the manufacturer's serial number of the Exit sign, whereas level D data 2143D may be a unique equipment number assigned by the user.

If the importance of an object 7000 changes over its lifetime, different levels may be added, or, deleted, as considered necessary. In our Exit sign example, the user may decide that levels C and D data, 2143C, D, are not needed in view of the circumstances. The relevant criteria for the importance of an object may be customized, and a predefinition of important and less important objects 7000 may be defined during the system configuration by defining different categories of importance.

The personal identification number 2141 may be a segmented series of level identification codes, such as 2141A, 2141B, 2141C and 2141D. These levels may be analogous to or even correspond to, for example, the technical data levels 2143A-D. For example, if the technical data levels 2143A-D include whole master data 8100, the PIN 2141 may function as an index to the technical data 2143. As distinguished from the technical data 2143 and administration data 2144, both of which may be subject to frequent change, the PIN 2141 may include master data 8100 that unlikely may change, such as accounting data, including, for example, cost center data, purchase order data, and invoice data, etc. While the PIN 2141 data likely may not change, the master data management system 2000 or the user may change the level of detail stored in the PIN 2141 as considered necessary, as is discussed above in reference to the technical data levels 2143A-D. Use of the PIN 2141 may be integrated as well in collaboration scenarios involving other systems and solutions, such as GIS, SCADA, DSM, AM/FM, GPS systems, etc.

The administration data 2144 may comprise any other relevant data that the user desires to store and access about given objects 7000. The user may structure the administration data 2144 according to contextual characteristics of the object 7000 for which the data is entered. For example, the administration data 2144 may include either a non-hierarchical set or a hierarchical set of variables 2111 and associated possible values 2112 specific to a given object 7000. A hierarchical set may correspond, for example, to the hierarchy of technical data 2143, such as admin data 2144A-D shown in FIG. 4, and as more specific levels of technical data 2143 are created, more detailed administration data 2144 may be required.

As alluded to above in reference to the Exit sign example, the user may desire to indicate, among other things, an object's location and date of installation, price paid, state and date of repair, presence of replacement parts, criticality, importance, risk, etc., as admin data 2144A-I. Because the level of detail appropriate for a given object 7000 may be unknown or change over time, the user may add or delete details within administration data 2144 when necessary. The administration data 2144 preferably may embody a minimum amount of data 8000 necessary to assist in uniquely identifying an object 7000, on the one hand, and to represent the importance or criticality of an object 7000.

In particular, there is often a perceived need for entry of voluminous data that later prove to be excessive and could be deleted. One problem in IT-systems is the deletion of master data that may be characterized as "old information." To address this problem, a DOIS 2100 (see FIGS. 2 and 3) may include "fade out" indicators 2150 that may be associated with part or all the PIN level identification codes 2141A-D, technical data 2143 and administration data 2144. When the fade out indicator reaches a fade out endpoint, a variety of actions may result, for example, a warning may be sent to the user indicating that the corresponding data 8000 may be ready for deletion, or alternatively, the corresponding data 8000 may be deleted and a notice may be sent indicating that the deletion occurred. For instance, each of the levels A, B, C, & D data, 2143A-D, may carry it's own fade out indicator 2150. The new model of database allows the users of the solution to get rid of serialized data or "equipment"-like data, i.e., levels C and D data 2143C & D, if an asset is not important or not subject of maintenance activities.

A fade out indicator 2150 may be associated with the master data 8100, for example, to remove master 8100 data that are not accessed or modified by a fade out endpoint, which is a completion of a fade out process, such as by a fade out date, within a fade out period and/or after a fade out level of use. Passing time to reach a fade out date or to complete the fade out period, using an object to fulfill the fade out level of use, and waiting for the appearance of a condition are examples of fade out processes and their fade out endpoints that may act as master data alarms notifying the MDMS 2000 to review the associated master data 8100. The fade out indicator 2150 may include one or more of these fade out processes and fade out endpoints, some of which may be rule-based. For example, the fade out indicator 2150, having a fade out level of use fade out endpoint, may be triggered when an actual or projected fade out level of use is reached, as determined by other variables 2111.

One purpose of a fade out indicator 2150 is to project a future time at which the associated data are archived as archive data 8400 in a data archive system 2400 (see FIG. 2) and deleted from the master data 8100. When user-specified conditions of a given fade out indicator 2150 are fulfilled, the given fade out indicator 2150 may indicate to the master data management system 2000 that the master data 8100 associated with given fade out indicator 2150 may be ripe for archiving and/or deletion. The master data 8100 preferably remain as thin as possible to improve data transmission and computation times within the systems accessing the master data 8100. The data archive system 2400 may be included within the MDMS 2000, or it may be a separate system, such as an archival server, disc drive, CD burner, etc.

The fade out indicator 2150 may be associated with the master data 8100 to remove data that are not accessed or modified by a fade out date, within a fade out period, after a fade out level of use, or some other user-specified measure. For example, a fade out indicator 2150 of a first object 7000 may depend on the status of a second object 7000, and if the second object 7000 is disposed of, the fade out indicator 2150 of the first object 7000 may trigger the archiving and/or deletion of master data 8100 associated with the first object 7000. An interim status of the fade out indicator 2150 may be represented by, for example, a graphical representation of a ticking timer, a bar graph, a digital countdown, etc.

Master data 8100 may be archived and deleted if, in accordance with parameters set by the user, the specific master data 8100 are deemed to be no longer necessary for the normal operations of the asset management system 1000. Insofar as the fade out indicator 2150 may schedule the associated data to be archived and deleted, the fade out indicator 2150 may be updated when the associated data are retrieved or altered. Generally speaking, master data 8100 and the fade out indicators 2150 may be updated when the master data 8100 are, or the associated object 7000 is, subject to consideration, such as when the master data 8100 are, or the object 7000 is, subject to maintenance, interrogation, evaluation, or observation. Retrieval or alteration of the associated data may be considered to indicate a minimum level of necessity to avoid archiving the associated data as soon as previously projected. For example, each time an object 7000 is subject to changes, maintenance or inspection activities, or even displayed by a user, the system may update the "fade out" indicator 2150 and develop an activity history for the object 700 with a description of the type of activity performed, when the activity was performed, and user identification information about who performed the activity.

However, the user may determine the triggers for the update of the fade out indicator 2150. Some users may decide, for instance, that accessing certain data does not warrant an update. More generally, though, recent viewing of data may foreshadow the need to view the data in the future, weighing against a pending deletion of the data.

In managing the master data 8100, the MDMS 2000 periodically may run batch programs to create lists of objects 7000 by system usage, or lists of object 7000 master data 8100 in light view of the fade out indicators 2150 associated with the master data 8100. As an illustration, a batch program may compile on a Friday a list of all master data 8100 having a fade out indicator 2150 due in the following week. The responsible manager then may decide what master data 8100 for which objects 7000 may be archived and deleted, and what fade out indicators 2150 should be updated manually to avoid master data 8100 from being archived and deleted. Depending on the parameters set by the user, the archiving and deletion process may occur automatically, or it may require confirmation by the user. This distinction also may be made on an object-by-object basis.

Similarly, batch programs may be run that perform a variety of other usage analyses. Depending on the purpose of a given batch program, the batch program may be run by the MDMS 2000 or by the MDPS 4000. The MDMS 2000 focuses on the master data 8100 themselves, while the MDPS 4000 focuses on interpreting the master data 8100 for use in the maintenance management system 3000. For instance, a batch program in MDMS 2000 may track the most frequently used master data 8100, while a batch program in MDPS 4000 may track trends in system usage of master data 8100. As the user tracks the master data 8100, the user may determine that aspects of the master data 8100 have become more important and may be transferred from level B data 2143B to level A data 2143A, or some other status change may occur. The duration of a fade out indicator 2150, i.e., the time between the update date and the scheduled "fade out" date, may be altered correspondingly for a given object 7000 as well, if the user determines that the scheduled "fade out" of the associated data occurs too frequently or too infrequently.

During the course of business, the MDPS 4000 may compile maintenance management information that the MDPS 4000 may use to optimize future maintenance. In general, optimizing maintenance basically means to perform the minimum possible amount of maintenance work (inspections, preventive maintenance and repairs) and provide the highest equipment effectiveness at a lower maintenance cost. Maintenance management information may include information relating to, for example, who has maintained what objects 7000; who does or does not perform maintenance on time; who does or does not perform maintenance well; who does or does not ship parts on time; who does or does not sell quality parts; how long does a given repair take; what is the wait time for a given repair; what, when and how objects 7000 are prone to disrepair; how often objects 7000 are maintained; etc.

The MDPS 4000 may weigh maintenance management information against object information when scheduling maintenance with the goal of optimizing the maintenance. As mentioned above, optimizing maintenance may be viewed as achieving the most effective use of an object with the least amount of maintenance work for the least maintenance cost. The maintenance management system may optimize maintenance, for example, using a maintenance optimization technique such as forecasting maintenance, revising maintenance forecasts, reprioritizing maintenance, rescheduling maintenance, tracking maintenance, evaluating maintenance, reducing maintenance costs, increasing maintenance quality, decreasing maintenance durations, and shortening object downtime. Examples of optimizing maintenance may include, for instance, creating an accurate, reasonable and realistic maintenance schedule; scheduling preventive maintenance for objects 7000 based on fade out indicators 2150 associated with parts subject to predictable wear and tear; selecting a cheap but slow parts vendor for a parts replacement maintenance scheduled far in the future; selecting an expensive but fast and reliable service vendor for spontaneous, immediately necessary high priority maintenance; etc.

After a certain time of system usage, the MDPS 4000 may provide the user with the ability to know or determine which conditions and functions are of importance, which types of objects 7000 and locations are of interest, and which repairs likely will be necessary and when. With this experiential knowledge, the user may remove or treat areas of less importance with lower interest, and treat areas of more importance with greater interest. An object's 7000 administration data 2144 may reflect the relative change in importance or criticality of the object 7000, while the level of technical data 2143 maintained may increase or decrease as a result. To the extent that similar objects 7000 are treated similarly, the user may implement system-wide changes at the levels and types of master data 8100 common to the similar objects 7000.

Naturally, an object 7000 or location may change in importance over the life cycle of an object 7000 or asset structure. For example, an old delivery vehicle may have been very important while it was the only delivery vehicle, but with the acquisition of a new delivery vehicle, the old delivery vehicle may be much less important. The dynamic object identification system 2100 model enables the creation of dynamic asset structures, viewing the objects by importance and helping to focus maintenance activities on the real important areas.

Using the available data 8000, the MDPS 4000 may determine what maintenance may be necessary given the conditions or status of objects 7000 described in the master data 8100. The MDPS 4000 likewise may prioritize the maintenance to be done based on such factors as a first object's 7000 relative importance, criticality, and present risk posed, as compared those factors of a second object 7000. Receiving the system data 8300 from the MDPS 4000, the maintenance management system 3000 may schedule and track maintenance of objects 7000.

As mentioned above with respect to the Exit sign example, a given object 7000 may be assigned relative indicators of, for example, importance and criticality, that may be included in the administration data 2144. These indicators may also be rule-based that may be calculated based on more general indicators. The Exit sign example also alluded to a rule-based indicator insofar as the relative overall importance of the Exit sign may be derived from the importance indicators associated with the Exit sign's placement, location and function.

Using these relative indicators, whether assigned or calculated, the MDPS 4000 may compare or categorize objects 7000 for a variety of purposes and create a dynamic asset structure. As mentioned above, the MDPS 4000 may list objects according to, for instance, relative importance or risk. For example, the MDPS 4000 may generate a ranking of objects 7000 that presently pose the greatest risks. Depending on the business, the types of objects, and user preferences, the user may specify what type of risk is listed. Using several rule-based indicators to calculate different types of risks, the user may customize how the MDPS 4000 handles the risk.

For example, a risk of economic loss based on a work stoppage caused by a worn-out assembly line belt may result in ordering a new assembly line belt, scheduling a replacement of the assembly line belt, and notifying a product manager that a product made on that assembly line may experience delays if the belt breaks before it can be replaced. In contrast, a risk of personal injury based on a damaged safety device on the assembly line may result in ordering a new safety device, scheduling an immediate replacement of the safety device, notifying the facility manager to closely monitor the status of the safety device, and if necessary, to shut down the assembly line until the safety device may be replaced, and notifying a product manager that a product made on that assembly line may experience delays if the assembly line is shut down before the safety device can be replaced.

The asset management system 1000 may use the fade out indicator 2150 in other ways. The fade out indicator 2150 may facilitate a dynamic display of asset master data 8100 inasmuch as the status of the "fade out" indicator 2150 may be used to determine the level of object 7000 detail offered to the user on the screen, in the asset portal or via data input/output interface 5000. The distinction here is that the master data 8100 that are not displayed have not been archived or deleted in this instance, and they remain readily available in the event that the user desires to view them. The premise is that users normally are familiar with the objects 7000 that they have to deal with on a regular basis.

The amount and type of displayed information may depend on the familiarity of the user with the object 7000, and this may be derived from the user's identification. Insofar as the fade out indicator 2150 for a given object 7000 may include user identification information, or point to an activity history associated with the given object 7000, the frequency with which a given user accesses certain master data 8100 may be determined from the activity history or changes to the fade out indicator 2150. The user may configure the asset management system 1000 to display more or less information about objects 7000 well known to the user than is displayed with objects unknown to the user. On the one hand, users more familiar with an object 7000 may desire to see specific, more detailed information about the object 7000, while on the other hand, other users who also are more familiar with object 7000 may desire to see less information than normally shown to users lacking much familiarity with the object 7000.

Implementation of the external key 2142 may be achieved using existing asset tagging technology, such as bar coding, or radio-frequency identification (RFID) tagging, also known as Auto-ID technology. In a bar coding scenario, a bar coded label is printed out and affixed to the object 7000 in question, with the external key 2142 encoded on the bar coded label. Typically the external key 2142 also will be printed in script on the bar coded label to facilitate reading of the external key 2142 in the event the bar code cannot be read. Using a bar code as a data source 6000 and the bar code scanner as a data input/output interface 5000, the user may read the bar code on the label, whereupon the external key 2142 is sent as source data 8200 to and recognized by the asset management system 1000. Using the external key 2142, the MDMS 2000 locates the GUID 2140 and the associated master data 8100 for the object 7000 in question.

Figure 5:
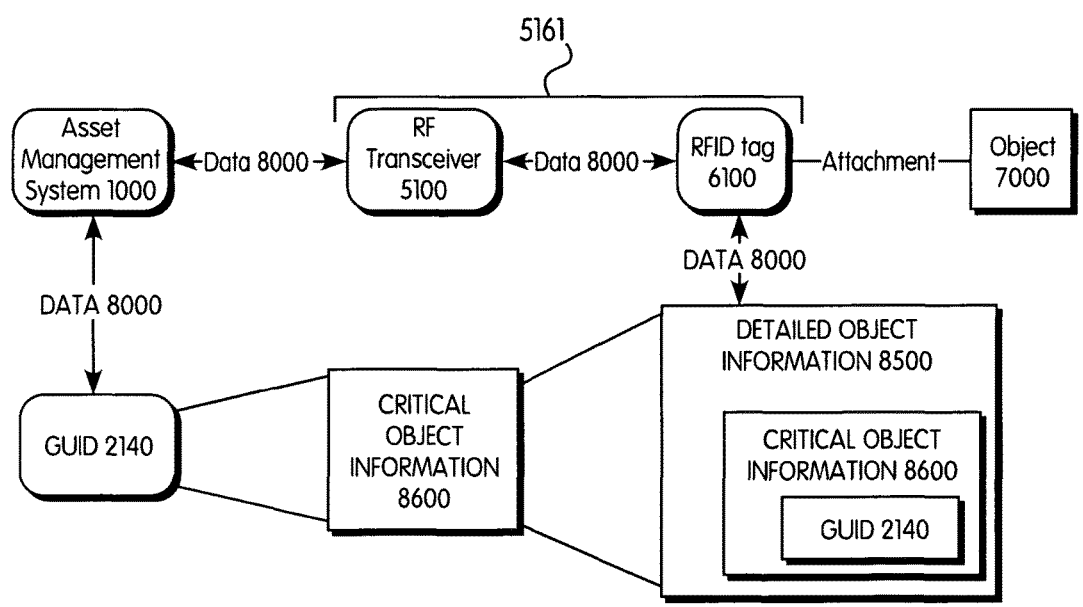
FIG. 5 is a schematic of an asset management system including a radio-frequency identification (RFID) tag.

By comparison, the use of RFID tags 6100, as shown in FIG. 5, to encode the external key 2142 permits more flexibility in operation than does use of bar coding. The external key 2142 may be a code of numbers embedded electronically in a chip or tag 6100 on each individual object 7000. The tags 6100 may be scanned by a wireless radio-frequency (RF) transceiver 5100 that functions as a data input/output interface 5000 to identify the object 7000. A radio-frequency identification system 5161 may include one or more RF transceivers 5100 and one or more RFID tags 6100. As an electronically programmable medium, the tag 6100 may be updated by appropriate software systems through radio-frequency communication as well. As a security precaution, the data 8000 stored and exchanged with the radio-frequency identification system 5161 may be encrypted and/or password protected.

If the asset management system 1000 is configured to support remote programming of RFID tags 6100, additional information, such as the GUID 2140, may be stored on the tag 6100. This RFID technology could be used as an integrated solution to optimize the master data management system 2000 and the maintenance management system 3000. The "middleware" between the back-office asset management system 1000 and the tag 6100 may be a special mobile data source 6000 that may be in wireless communication with the asset management system 1000.

Upon the purchase or installation of equipment, an object 7000 may be tagged with an RFID tag 6100. The original equipment manufacturer or the vendor may provide the initial relevant master data 8100, and this initial master data 8100 may be input in the asset management system 1000. If the object is received from a maintenance organization, maintenance information may be included as well. Preferably, the object 7000 may be shipped with the initial master data 8100 already stored on an accompanying tag 6100.

As soon as an object 7000 with an RFID tag 6100 becomes the subject of maintenance activities, data 8000 stored on the tag 6100 may be pulled from the tag 6100. After performing the maintenance work, the user may reprogram the tag 6100 with the most important maintenance information, such as who did it, what was done, and when was it done, including counter reading information and condition. The fade out indicator 2150 may be stored on the tag 6100 as well, and updating the fade out indicator 2150 may trigger whether the object 7000 changes status within the back-office maintenance management system 3000. The user may configure the asset management system 1000 so that at least the fade out indicator 2150, and possibly the entire tag 6100, is updated every time a tag 6100 is read by the maintenance RFID reader 6000.

Over a longer period of time, such an asset management system 1000 may gather and process sufficient quantities of maintenance management information as to allow maintenance engineers to make valid comparisons between objects 7000 in the maintenance management system 3000, generally, such as between tagged objects 7000 in the plant or production facilities. As before, the fade out indicator 2150 again may help distinguish between important and less important equipment. One benefit is that master data 8100 for all objects 7000 remain available, but the effort of maintaining master data 8100 is not very high. For example, a company having 100 same-model laptop computers, each having an RFID tag 6100, readily may compare the reliability of the laptop computers by looking at maintenance records, if any, for the laptops, with minimal effort on behalf of the user.

In one implementation, a user may store as much detailed object information 8500 as possible or available directly on the RFID tag 6100 and include a minimal amount of critical object information 8600 in the GUID 2140 to be stored and managed in the master data management system 2000. The GUID 2140 may be derived from the critical object information 8600, and the critical object information 8600 may be extracted from the detailed object information 8500, as depicted in FIG. 5.

Inasmuch as most detailed object information 8500 may be necessary only in the event that the object 7000 requires maintenance, which typically would involve handling the object 7000, the detailed object information 8500 need not be available remotely from the MDMS 2000. The detailed object information 8500 therefore would not clutter the MDMS 2000 with rarely used data, allowing the MDMS 2000 to manage a minimal amount of master data 8100.

When an object 7000 is subject to maintenance, the object 7000 may be handled directly, at which point the RFID tag 6100 may be read and the detailed object information 8500 accessed. The user may update the RFID tag 6100 with detailed maintenance data relating to the maintenance performed on the object 7000, and the critical aspects of the maintenance data may be incorporated into the GUID 2140. The MDMS 2000 and the master data 8100 may be updated with the updated GUID 2140.

The use of pre-programmed RFID tag technology may provide maintenance people the opportunity to track large numbers of objects 7000 without manually setting up master data or manually maintaining and changing master data 8100. Manufacturers of objects 7000 may ship the objects 7000 with RFID tags 6100 pre-programmed with detailed object information 8500, from which critical object information 8600 could be derived and input into the MDMS 2000. The master data 8100 likewise may be maintained via automatic updates provided by RFID interrogation. This RFID technology could be ideal for companies who want to track equipment like mobile phones, handheld devices, laptops etc. A similar process may work for company cars or any other type of mobile equipment. In complex asset structures, maintenance engineers may track components of complex assets as individual objects 7000, potentially having only parts of the structure in their maintenance management system 3000.

Taking as an example the tracking of mobile phones, a user may desire to know critical object information 8600, such as how many phones are in use, what types they are, when they were bought, who is using them, etc., but this critical object information 8600 largely may not change over time and likely may require very little data management. That is to say, once this critical object information 8600 is entered, this critical object information 8600 rarely may be looked at again. In many instances, the person identified as using the mobile phone may be the only critical object information 8600 that may change.

Moreover, the user may be interested in knowing detailed object information 8500 only in the event that a mobile phone requires maintenance. If a mobile phone needs a new battery or a new antenna, for example, the user may desire to access model numbers for the replacement parts when ordering the replacement parts. Over the useful life of many mobile phones, however, no maintenance whatsoever may be necessary. With objects 7000 such as mobile phones that often may out live their expected useful lives without requiring maintenance, storing such detailed object information 8500 in the MDMS 2000 may be unnecessary.

However, each mobile phone may have available a plethora of detailed object information 8500 that the user may be loath to manually input anywhere, store and manage in a MDMS 2000, or dispose of and not store somewhere. This recurring dilemma of data management requires the user to reach a compromise over which detailed object information 8500 warrant being input, stored, and/or managed.

Using RFID tags 6100 and a MDMS 2000, the user may avoid this dilemma in possibly several ways. Beyond just avoiding this dilemma, using the RFID tags 6100 and the MDMS 2000 may provide the user with additional benefits. First, the user may receive much of the detailed object information 8500 about each mobile phone electronically from the manufacturer, avoiding the need to manually input this detailed object information 8500. Less manual data input may mean faster, more accurate, and less expensive data input.

Second, the user may use a handheld RF transceiver 5100 to migrate and store this detailed object information 8500 on an RFID tag 6100. Additional object information that is user-specific, such as who is using the mobile phone, may be input using an RF transceiver 5100 and stored on the RFID tag 6100. Using the RF transceiver 5100 and RFID tags 6100 may minimize concerns about, and may maximize efficiency of, data input and storage.

Third, the user may extract critical object information 8600 from the detailed object information 8500 and incorporate this critical object information 8600 for each mobile phone into a GUID that is stored and managed in the MDMS 2000. The master data 8100 thereby may remain thin and efficient, which may reduce the instances of storing and processing of excessive, unnecessary master data 8100.

Fourth, the user may reduce overall master data management costs, increase overall master data management efficiency, and increase overall master data management reliability. From a reliability perspective, the detailed object information 8500 may come direct from the manufacturer, whose data 8000 should be reliable, and distributed storage of the data may provide distributed, independent back-ups of master data 8100 for each object 7000. From a data integrity perspective, the MDMS 2000 may encounter fewer data errors given the fewer data under management and the less frequent manual entry of data.

The asset management system 1000 likewise may support the replacements of objects 7000 and parts as well, and incorporating RFID technology may result in a significant reduction of installation and dismantling transactions in the back-office work with the asset management system 1000. In the event that an object 7000 has an RFID tag 6100, maintenance engineers similarly and easily may track the end of life of the object 7000, because the tagged object 7000 may be tracked when it is dismantled and scrapped.

Figure 6:
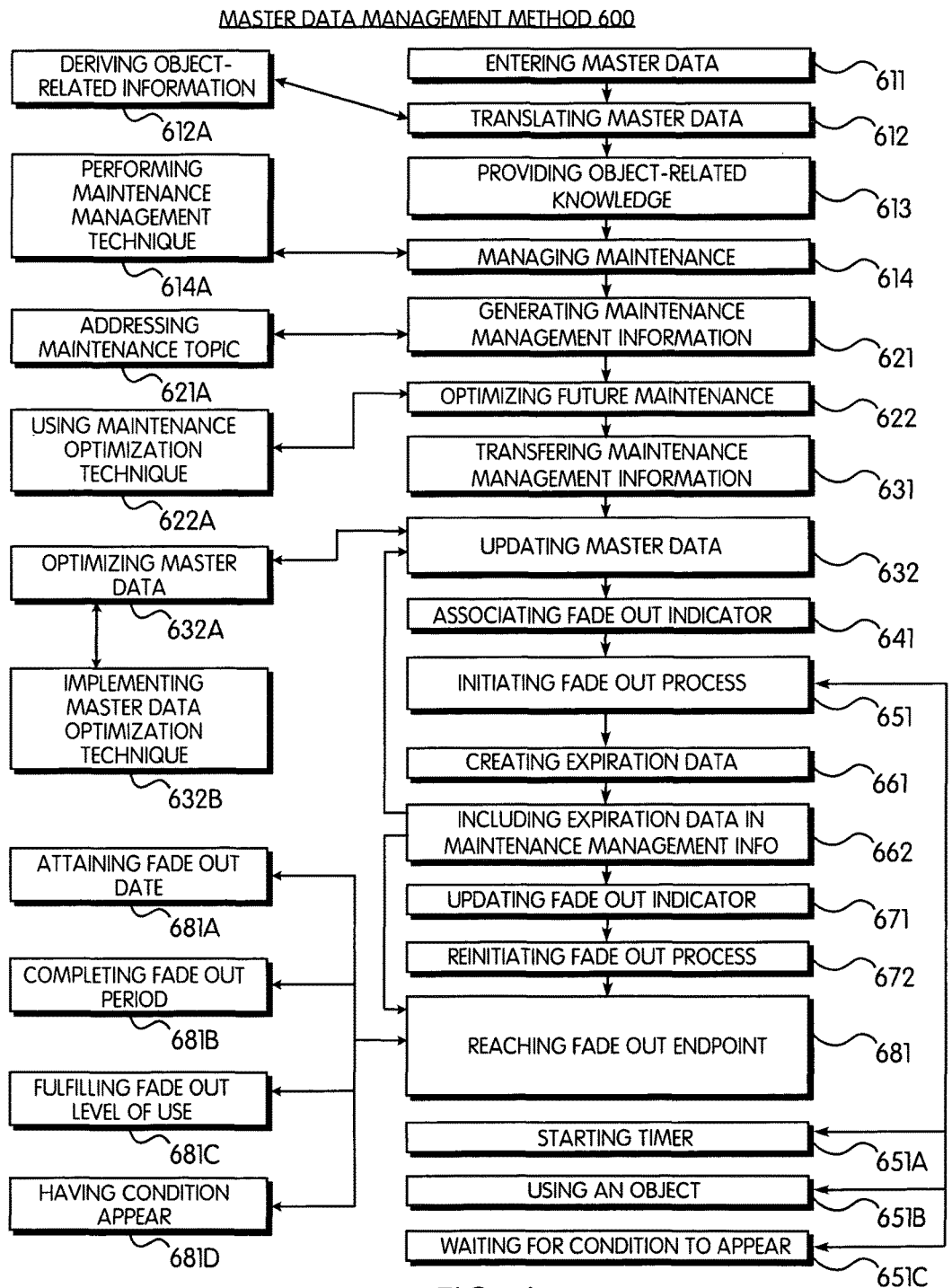
FIG. 6 is a schematic of a master data management method.

As shown in FIG. 6, a master data management method (600) for managing master data 8100 pertaining to an object 7000 may include entering (611) master data 8100 in a master data management system 2000; translating (612) master data 8100 of objects 7000 subject to maintenance into object-related knowledge in a master data processing system 4000; providing (613) the object-related knowledge to a maintenance management system 3000; and managing (614) the maintenance of the objects 7000 in the maintenance management system 3000 in view of the object-related knowledge.

Translating (612) master data 8100 of objects 7000 subject to maintenance into object-related knowledge in a master data processing system 4000 may include, for example, deriving (612A) contextual object-related information such as relative priority of maintenance of the object 7000, relative importance of the object 7000, relative criticality of the object 7000, relative risk posed by the object 7000, relative familiarity of a user with the object 7000, projected time of anticipated required maintenance to the object 7000, and/or projected time of failure of the object 7000.

In addition, managing (614) the maintenance of the objects 7000 in the maintenance management system 3000 in view of the object-related knowledge may include, for instance, performing (614A) one or more maintenance management techniques that may involve prioritizing maintenance, scheduling maintenance, requisitioning maintenance, ordering maintenance materials, arranging maintenance services, notifying a user of the object-related knowledge, categorizing the object 7000, displaying master data 8100 of the object 7000, and/or prompting an update of master data 8100 of the object 7000.

Also as shown in FIG. 6, the master data management method (600) for managing master data 8100 further may include generating (621) maintenance management information in the maintenance management system 3000 and optimizing (622) management of future maintenance in the maintenance management system 3000 in view of the maintenance management information. Generating (621) maintenance management information in the maintenance management system 3000 may include, for example, addressing (621A) one or more maintenance topics, such as who has maintained what objects 7000; who does perform maintenance on time; who does not perform maintenance on time; who does perform maintenance well; who does not perform maintenance well; who does ship parts on time; who does not ship parts on time; who does sell quality parts; who does not sell quality parts; how long does a given repair take; what is the wait time for a given repair; what objects 7000 are prone to disrepair; when are objects 7000 prone to disrepair; how are objects 7000 prone to disrepair; or how often are objects 7000 maintained.

Likewise, optimizing (622) management of future maintenance in the maintenance management system 3000 in view of the maintenance management information may include using (622A) one or more maintenance optimization techniques, such as forecasting maintenance, revising maintenance forecasts, reprioritizing maintenance, rescheduling maintenance, tracking maintenance, evaluating maintenance, reducing maintenance costs, increasing maintenance quality, decreasing maintenance durations, or shortening object downtime.

The master data management method (600) for managing master data 8100, as depicted in FIG. 6, further may include transferring (631) maintenance management information from the maintenance management system 3000 to the master data management system 2000; and updating (632) master data 8100 in view of the maintenance management information. Updating (632) master data 8100 in view of the maintenance management information may include optimizing (632A) master data 8100. Optimizing (632A) master data 8100 may include implementing (632B) one or more master data optimization techniques. A master data optimization technique may involve, for example, generally updating master data 8100 (e.g., replacing outdated values with current values), archiving master data 8100, deleting master data 8100, proposing a specific level of detail in which an associated object 7000 should be tracked, proposing a general level of detail in which objects 7000 associated with a given location should be tracked, proposing a status in which the associated object 7000 should be tracked, and/or proposing a level of importance that should be assigned to the given location.

Furthermore, the master data management method (600) for managing master data 8100 may include associating (641) at least one fade out indicator 2150 with master data 8100 and initiating (651) at least one fade out process of the at least one fade out indicator 2150. Creating (661) expiration data based on the at least one fade out indicator 2150, and including (662) the expiration data in the maintenance management information may follow. The method (600) may loop back to updating (632) master data 8100 at this point. Updating (671) at least a portion of the at least one fade out indicator 2150 may occur when the object 7000 is subject to maintenance, or otherwise interrogated (e.g., read), at which point, reinitiating (672) the at least one fade out process of the updated portion of the at least one fade out indicator 2150 may be done.

The at least one fade out process has at least one fade out endpoint, and completion of the at least one fade out process involves reaching (681) at least one fade out endpoint. The method (600) likewise may include reaching (681) at least one fade out endpoint after including (662) the expiration data in the maintenance management information where no updating (671) at least a portion of the at least one fade out indicator 2150 occurs. Initiating (651) at least one fade out process may include one of starting (651A) a timer, using (651B) an object 7000, and waiting (651C) for a condition to appear, whereas reaching (681) at least one fade out endpoint may include one of attaining (681A) a fade out date, completing (681B) a fade out period, fulfilling (681C) a fade out level of use, and having (681D) a condition appear.

Figure 7:
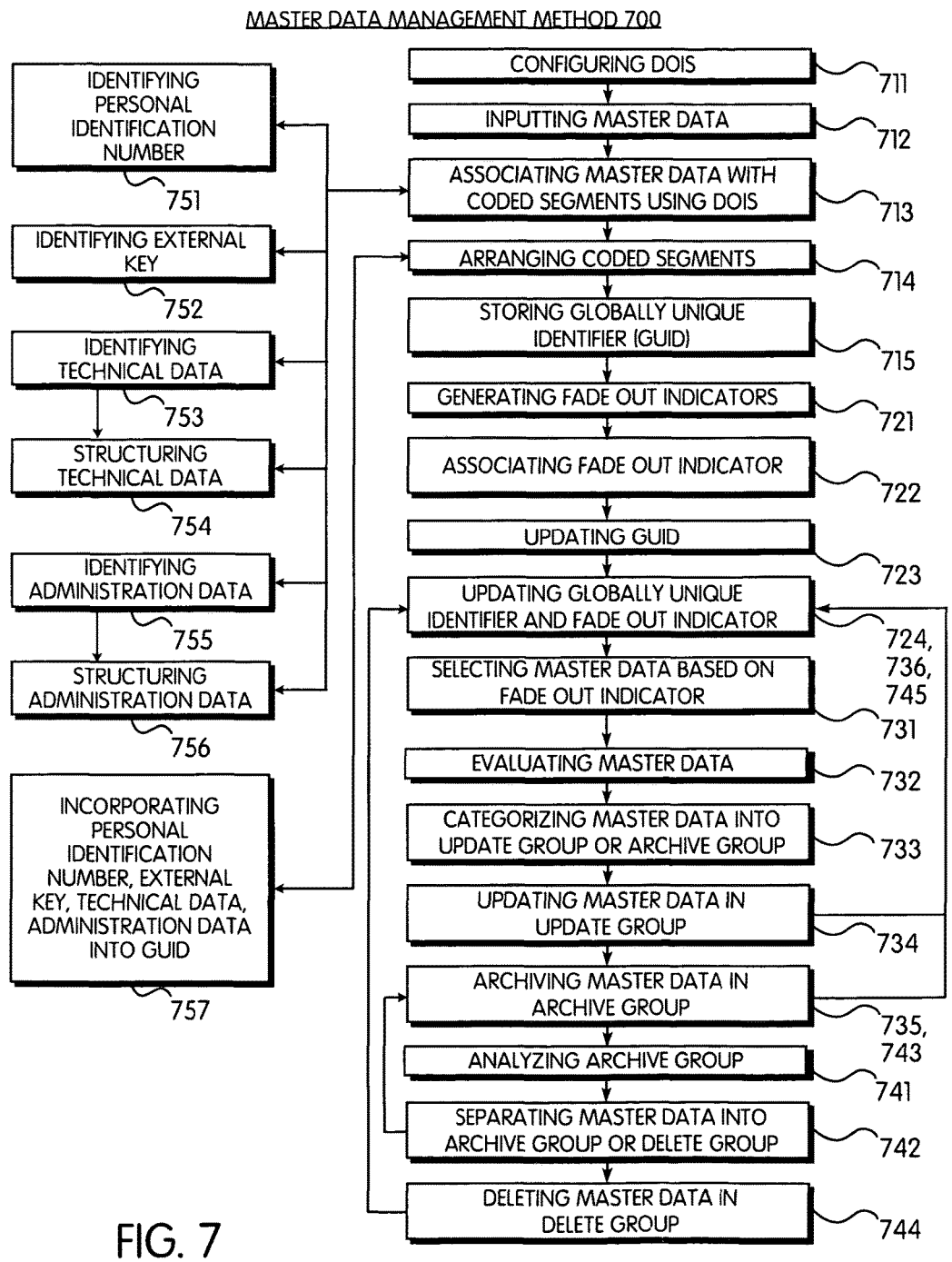
FIG. 7 is a schematic of a master data management method.

As shown in FIG. 7, a master data management method (700) for managing master data 8100 pertaining to an object 7000 may include configuring (711) a dynamic object identification system 2100 according to user preferences; inputting (712) master data 8100 into the dynamic object identification system 2100; associating (713) master data 8100 with coded segments 2145 using the dynamic object identification system 2100; arranging (714) the coded segments 2145 into a globally unique identifier 2140; and storing (715) the globally unique identifier 2140 in a master data management system database 2200.

The method (700) further may include generating (721) fade out indicators 2150 for at least portions of master data 8100 with the dynamic object identification system 2100; associating (722) the fade out indicators 2150 with the at least portions of the master data 8100; updating (723) the globally unique identifier 2140 in view of the fade out indicators 2150; and updating (724) the fade out indicators 2150 and the globally unique identifier 2140 when the at least portions of master data 8100 are updated.

The method (700) also may include selecting (731) the at least portions of master data 8100 having fade out indicators 2150 reaching fade out endpoints within parameters set by the user; evaluating (732) the selected portions of master data 8100; categorizing (733) the selected portions of master data 8100 into at least one group chosen from an update group and an archive group; updating (734) the selected portions of master data 8100 associated with the update group; archiving (735) the selected portions of master data 8100 associated with the archive group; updating (736) the globally unique identifier 2140 and the fade out indicators 2150 in view of changes to the selected portions of master data 8100.

The method (700) further may include analyzing (741) the selected portions of master data 8100 associated with the archive group; separating (742) the analyzed portions of master data 8100 into the archive group and a delete group; archiving (743) the analyzed portions of master data 8100 separated into the archive group; deleting (744) the analyzed portions of master data 8100 separated into the delete group; and updating (745) the globally unique identifier 2140 and the fade out indicators 2150 in view of changes to the analyzed portions of master data 8100.

Within the method (700), the step of associating (713) master data 8100 with coded segments 2145 using the dynamic object identification system 2100 may include identifying (751) a personal identification number 2141 for the object 7000; identifying (752) an external key 2142 associated with the object 7000; identifying (753) technical data 2143 associated with the object 7000; structuring (754) the technical data 2143 according to the user preferences; identifying (755) administration data 2144 associated with the object 7000; and structuring (756) the administration data 2144 according to the user preferences. Within the method (700), the step of arranging (714) the coded segments 2145 into a globally unique identifier 2140 may include incorporating (757) the personal identification number 2141, the external key 2142, the technical data 2143, and the administration data 2144 in the globally unique identifier 2140 according to the user preferences.

Figure 8A:
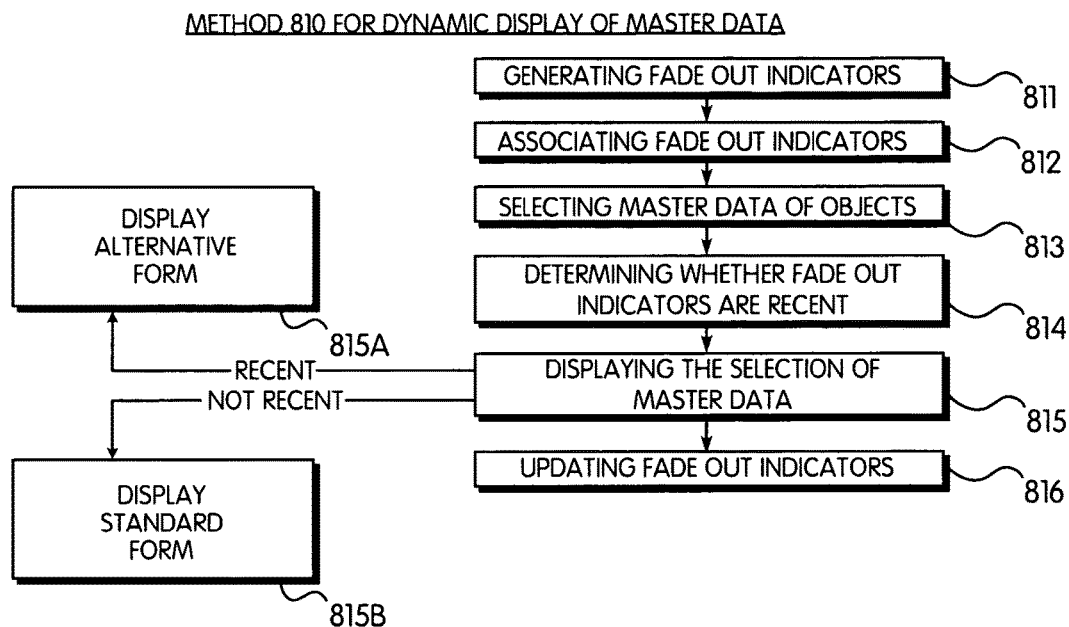
FIGS. 8A and 8B are schematics of methods for the dynamic display of master data.

As shown in FIG. 8A, a method (810) for the dynamic display of master data 8100 may include generating (811) fade out indicators 2150 for at least portions of master data 8100 pertaining to a specific object 7000; associating (812) the fade out indicators 2150 with the at least portions of the master data 8100; selecting (813) for display master data 8100 pertaining to the specific object 7000; determining (814) whether the fade out indicators 2150 have been generated recently ("recently" being defined by the user), as a basis to infer whether the selection of master data 8100 has been displayed or modified recently; displaying (815) the selection of master data 8100 either in an alternative form (e.g., abbreviated or expanded) (815A) if the fade out indicators 2150 are determined to have been generated recently, or in a standard form (e.g., unabbreviated and unexpanded) (815B) if the fade out indicators 2150 are determined not to have been generated recently; and updating (816) the fade out indicators 2150 of the displayed master data 8100 in light of the display.

Figure 8B:
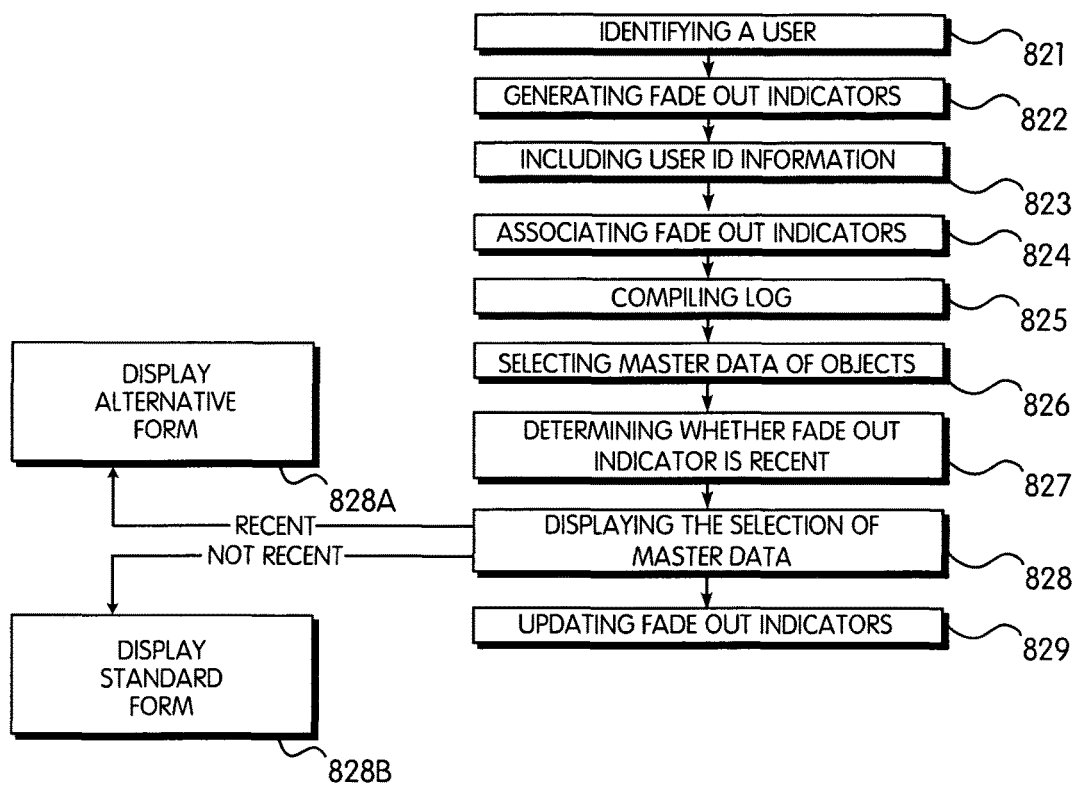

As shown in FIG. 8B, a method (820) for the dynamic display of master data 8100 in a user-specific environment may include identifying (821) a user; generating (822) fade out indicators 2150 for at least portions of master data 8100 pertaining to a specific object 7000; including (823) user identification information with the fade out indicators 2150; associating (824) the fade out indicators 2150 with the at least portions of the master data 8100; compiling (825) a log of fade out indicators 2150; selecting (826) for display master data 8100 pertaining to the specific object 7000; determining (827) whether a fade out indicator 2150 from the log has been generated recently for the user, as a basis to infer whether the user recently has viewed the selection of master data 8100 or recently handled the specific object 7000; displaying (828) the selection of master data 8100 either in an alternative form (e.g., abbreviated or expanded) (828A) if a fade out indicator 2150 is determined to have been generated recently for the user, or in a standard form (e.g., unabbreviated and unexpanded) (828B) if no fade out indicator 2150 is determined to have been generated recently for the user; and updating (829) the fade out indicators 2150 of the displayed master data 8100, including user identification information, in light of the display for the user.

As shown in FIG. 9, a method (900) for the management of master data may include interrogating (911) an RFID tag 6100 associated with an object 7000; extracting (912) initial master data 8100 from detailed object data, and this initial master data 8100 may be input in the asset management system 1000. If the object is received from a maintenance organization, maintenance information may be included as well. Preferably, the object 7000 may be shipped with the initial master data 8100 already stored on an accompanying tag 6100. As soon as an object 7000 with an RFID tag 6100 becomes the subject of maintenance activities, data 8000 stored on the tag 6100 may be pulled from the tag 6100. After performing the maintenance work, the user may reprogram the tag 6100 with the most important maintenance information, such as who did it, what was done, and when was it done, including counter reading information and condition. The fade out indicator 2150 may be stored on the tag 6100 as well, and updating the fade out indicator 2150 may trigger whether the object 7000 changes status within the back-office maintenance management system 3000. The user may configure the asset management system 1000 so that at least the fade out indicator 2150, and possibly the entire tag 6100, is updated every time a tag 6100 is read by the maintenance RFID reader 6000.

The invention has been described in terms of particular embodiments. Other embodiments are within the scope of the following claims. For example, the steps of the invention can be performed in a different order and still achieve desirable results.

The invention can be implemented in digital electronic circuitry, or in computer hardware, firmware, software, or in combinations of them. The invention can be implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps of the invention can be performed by one or more programmable processors executing a computer program to perform functions of the invention by operating on input data and generating output. Method steps can also be performed by, and apparatus of the invention can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks such as internal hard disks and removable disks; magneto-optical disks; and CD-ROM and DVD-ROM disks. The processor and the memory can be supplemented by, or incorporated in special purpose logic circuitry.

To provide for interaction with a user, the invention can be implemented on a computer having a display device such as a CRT (cathode ray tube) or LCD (liquid crystal display) monitor for displaying information to the user and a keyboard and a pointing device such as a mouse or a trackball by which the user can provide input to the computer. Other kinds of devices can be used to provide for interaction with a user as well; for example, feedback provided to the user can be any form of sensory feedback, such as visual feedback, auditory feedback, or tactile feedback; and input from the user can be received in any form, including acoustic, speech, or tactile input.

The invention can be implemented in a computing system that includes a back-end component, e.g., as a data server, or that includes a middleware component, e.g., an application server, or that includes a front-end component, e.g., a client computer having a graphical user interface or an Web browser through which a user can interact with an implementation of the invention, or any combination of such back-end, middleware, or front-end components. The components of the system can be interconnected by any form or medium of digital data communication, e.g., a communication network. Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

What is claimed is:

1. An asset management system for management of assets, the asset management system comprising:
   a computer system comprising at least one processor and memory including instructions that, when executed by the at least one processor, cause the computer system to operate as a plurality of systems, the systems comprising:
      a master data management system configured to facilitate management of master data pertaining to objects selected from among the assets, the master data selected from object data, the master data including at least one fade out indicator indicating whether a portion of the master data associated with the at least one fade out indicator is suitable for removal from the master data management system;
      a maintenance management system configured to manage maintenance of a plurality of objects subject to maintenance; and
      a master data processing system configured to
         derive, based on master data of an object of the plurality of objects subject to maintenance and the at least one fade out indicator, object-related knowledge associated with the object, the object-related knowledge comprising an indication of a priority for maintenance of the object relative to other objects of the plurality of objects subject to maintenance, and
         provide the object-related knowledge to the maintenance management system, wherein the maintenance management system is configured to manage maintenance of the object based on the indication of the priority for maintenance of the object, and to display a level of detail of the master data of the object based on the at least one fade out indicator for the object.

2. The asset management system of claim 1, wherein the objects include tags for identification within the master data management system.

3. The asset management system of claim 1, wherein the object-related knowledge comprises a relative importance of the object.

4. The asset management system of claim 1, wherein the object-related knowledge comprises a relative criticality of the object.

5. The asset management system of claim 1, wherein the object-related knowledge comprises a relative risk posed by the object.

6. The asset management system of claim 1, wherein the object-related knowledge comprises a relative familiarity of a user with the object.

7. The asset management system of claim 1, further comprising translating master data of the object subject to maintenance into object-related information comprising a projected time of anticipated required maintenance to the object.

8. The asset management system of claim 1, further comprising translating master data of the object subject to maintenance into object-related information comprising a projected time of failure of the object.

9. The asset management system of claim 1, wherein the maintenance management system is configured to consider the object-related knowledge of an object in performing at least one of a maintenance management technique.

10. The asset management system of claim 9, wherein the maintenance management technique includes prioritizing maintenance.

11. The asset management system of claim 9, wherein the maintenance management technique includes scheduling maintenance.

12. The asset management system of claim 9, wherein the maintenance management technique includes requisitioning maintenance.

13. The asset management system of claim 9, wherein the maintenance management technique includes ordering maintenance materials.

14. The asset management system of claim 9, wherein the maintenance management technique includes arranging maintenance services.

15. The asset management system of claim 9, wherein the maintenance management technique includes notifying a user of the object-related knowledge.

16. The asset management system of claim 9, wherein the maintenance management technique includes categorizing the object.

17. The asset management system of claim 9, wherein the maintenance management technique includes displaying master data of the object.

18. The asset management system of claim 9, wherein the maintenance management technique includes prompting an update of master data of the object.

19. The asset management system of claim 1, wherein the maintenance management system is configured to generate maintenance management information that the maintenance management system is configured to weigh in optimizing management of future maintenance.

20. The asset management system of claim 19, wherein the maintenance management information comprises an indication of who has maintained which objects.

21. The asset management system of claim 19, wherein the maintenance management information comprises measurements of timeliness of maintenance performance by maintenance performers.

22. The asset management system of claim 19, wherein the maintenance management information comprises measurements of quality of maintenance performance by maintenance performers.

23. The asset management system of claim 19, wherein the maintenance management information comprises measurements of timeliness of product delivery by parts suppliers.

24. The asset management system of claim 19, wherein the maintenance management information comprises measurements of quality of products delivered by parts suppliers.

25. The asset management system of claim 19, wherein the maintenance management information comprises an indication of how long a given repair takes.

26. The asset management system of claim 19, wherein the maintenance management information comprises an indication of what the wait time for a given repair is.

27. The asset management system of claim 19, wherein the maintenance management information comprises an indication of how prone the objects are to disrepair.

28. The asset management system of claim 19, wherein the maintenance management information comprises an indication of when objects are expected to be in a state of disrepair.

29. The asset management system of claim 19, wherein the maintenance management information comprises an indication of the manner in which objects are prone to disrepair.

30. The asset management system of claim 19, wherein the maintenance management information comprises an indication of how often are objects maintained.

31. The asset management system of claim 19, wherein the maintenance management system is configured to perform a maintenance optimization technique.

32. The asset management system of claim 31, wherein the maintenance optimization technique includes forecasting maintenance.

33. The asset management system of claim 31, wherein the maintenance optimization technique includes revising maintenance forecasts.

34. The asset management system of claim 31, wherein the maintenance optimization technique includes reprioritizing maintenance.

35. The asset management system of claim 31, wherein the maintenance optimization technique includes rescheduling maintenance.

36. The asset management system of claim 31, wherein the maintenance optimization technique includes tracking maintenance.

37. The asset management system of claim 31, wherein the maintenance optimization technique includes evaluating maintenance.

38. The asset management system of claim 31, wherein the maintenance optimization technique includes reducing maintenance costs.

39. The asset management system of claim 31, wherein the maintenance optimization technique includes increasing maintenance quality.

40. The asset management system of claim 31, wherein the maintenance optimization technique includes decreasing maintenance durations.

41. The asset management system of claim 31, wherein the maintenance optimization technique includes shortening object downtime.

42. The asset management system of claim 19, wherein the master data management system is configured to receive the maintenance management information from the maintenance management system and update the master data in view of the maintenance management information.

43. The asset management system of claim 42, wherein the master data management system is configured to update the master data in view of the maintenance management information by performing a master data optimization technique, wherein the master data optimization technique comprises removing at least a portion of the master data from the master data management system in view of the maintenance management information.

44. The asset management system of claim 43, wherein the master data optimization technique includes proposing a specific level of detail in which an associated object should be tracked.

45. The asset management system of claim 43, wherein the master data optimization technique includes proposing a general level of detail in which objects associated with a given location should be tracked.

46. The asset management system of claim 43, wherein the master data optimization technique includes proposing a status in which an associated object should be tracked.

47. The asset management system of claim 43, wherein the master data optimization technique includes proposing a level of importance that should be assigned to a given location.

48. The asset management system of claim 1, further comprising a dynamic object identification system including an object criteria set, an object rule set, and an object identification system.

49. The asset management system of claim 48, wherein the object criteria set includes variables and possible values, wherein the object rule set includes rules incorporating the variables, and the object identification system includes a globally unique identifier.

50. The asset management system of claim 49, wherein the object identification system is configured to assemble the globally unique identifier based at least on user-determined parameters, wherein the globally unique identifier includes at least one coded segment, and wherein the at least one coded segment includes object data selected from a group consisting of at least one of a personal identification number, at least one of an external key, technical data, and administration data.

51. The asset management system of claim 49, wherein the object identification system is configured to assemble the globally unique identifier based at least on user-determined parameters, wherein the globally unique identifier includes coded segments corresponding to at least one of a personal identification number, at least one of an external key, technical data, and administration data.

52. The asset management system of claim 51, wherein the user-determined parameters comprise at least one variable from the object criteria set and at least one rule from the object rule set.

53. The asset management system of claim 51, wherein the technical data include a multi-level data storage hierarchy.

54. The asset management system of claim 51, wherein the personal identification number comprises a segmented series of level identification codes.

55. The asset management system of claim 54, wherein the series of level identification codes relate to a multi-level data storage hierarchy.

56. The asset management system of claim 51, wherein the administration data include contextual data.

57. The asset management system of claim 51, wherein the globally unique identifier includes the at least one fade out indicator.

58. The asset management system of claim 57, wherein the at least one fade out indicator includes at least one of a fade out process and at least one of a fade out endpoint.

59. The asset management system of claim 58, wherein the fade out process includes one of passing time, and wherein the fade out endpoint includes one of attainment of a fade out date and completion of a fade out period.

60. The asset management system of claim 58, wherein the fade out process includes using an object, and wherein the fade out endpoint includes fulfillment of a fade out level of use.

61. The asset management system of claim 58, wherein the fade out process includes waiting for a condition to appear, and wherein the fade out endpoint includes an appearance of a condition.

62. The asset management system of claim 1, wherein the master data management system further includes a data archive system.

63. An asset management system for management of assets, the asset management system comprising:
a computer system comprising at least one processor and memory including instructions that, when executed by the at least one processor, cause the computer system to operate as a plurality of systems, the systems comprising:
a master data management system configured to facilitate management of master data pertaining to objects selected from among the assets, the master data selected from object data and including fade out indicators, wherein each of the fade out indicators indicates whether a portion of the master data associated with the fade out indicator is suitable for removal from the master data management system;
a maintenance management system configured to manage maintenance of a plurality of objects subject to maintenance; and
a master data processing system configured to
generate object-related knowledge from the master data of the plurality of objects subject to maintenance and based on the fade out indicators, the object-related knowledge comprising an indication of a priority for maintenance of an object relative to other objects of the plurality of objects subject to maintenance, and
provide the object-related knowledge to the maintenance management system, wherein the maintenance management system is configured to manage maintenance of the plurality of objects based on the object-related knowledge, and to display a level of detail of the master data of the plurality of objects based on the fade out indicators.

64. The asset management system of claim 63, wherein the master data management system is configured to maintain a given object by updating at least a portion of the fade out indicators associated with the given object.

65. The asset management system of claim 63, wherein the asset management system includes expiration data based on the fade out indicators associated with the master data.

66. The asset management system of claim 63, wherein the fade out indicator includes at least one of a fade out process and at least one of a fade out endpoint.

67. The asset management system of claim 66, wherein the fade out process includes passing time, and wherein the fade out endpoint includes one of attainment of a fade out date and completion of a fade out period.

68. The asset management system of claim 66, wherein the fade out process includes using an object, and wherein the fade out endpoint includes fulfillment of a fade out level of use.

69. The asset management system of claim 66, wherein the fade out process includes waiting for a condition to appear, and wherein the fade out endpoint includes an appearance of a condition.

70. The asset management system of claim 63, the master data associated with the fade out indicator being suitable for removal based on the master data associated with the fade out indicator not being accessed by a fade out date, or not being accessed within a fade out time period.

71. The asset management system of claim 70, the master data management system being configured to update the fade out indicator based on the master data associated with the fade out indicator being accessed.

72. The asset management system of claim 71, the master data management system being configured to update the fade out indicator by resetting the fade out date or resetting a timer associated with the fade out time period.

73. The asset management system of claim 63, the master data management system being configured to remove the master data associated with the fade out indicator by at least one of archiving the master data associated with the fade out indicator and deleting the master data associated with the fade out indicator.

\* \* \* \* \*